(12) United States Patent
McElveen et al.

(10) Patent No.: US 10,075,105 B2
(45) Date of Patent: Sep. 11, 2018

(54) END RING AND ROTOR BAR FOR LINE START PERMANENT MAGNET MOTOR

(71) Applicant: Baldor Electric Company, Fort Smith, AR (US)

(72) Inventors: Robert F. McElveen, Anderson, SC (US); Richard J. Budzynski, Simpsonville, SC (US)

(73) Assignee: Baldor Electric Company, Fort Smith, AR (US)

( * ) Notice: Subject to any disclaimer, the term of this patent is extended or adjusted under 35 U.S.C. 154(b) by 1018 days.

(21) Appl. No.: 14/258,281

(22) Filed: Apr. 22, 2014

(65) Prior Publication Data

US 2015/0303747 A1    Oct. 22, 2015

(51) Int. Cl.

| | |
|---|---|
| *H02K 17/16* | (2006.01) |
| *H02K 1/27* | (2006.01) |
| *H02K 21/46* | (2006.01) |
| *H02P 1/50* | (2006.01) |
| *H02P 1/16* | (2006.01) |

(52) U.S. Cl.
CPC ............. *H02P 1/50* (2013.01); *H02K 17/16* (2013.01); *H02K 17/165* (2013.01); *H02K 21/46* (2013.01); *H02P 1/166* (2013.01); *H02K 1/2706* (2013.01); *H02K 2213/03* (2013.01)

(58) Field of Classification Search
CPC .. H02K 17/16; H02K 17/165; H02K 15/0012; H02K 17/18; H02K 17/185; H02K 17/20; H02K 17/205; H02K 21/46; H02K 2213/03; H02P 1/16; H02P 1/50; H02P 1/166
USPC .............. 310/125, 211, 212, 156.78–156.84; 29/596, 598
See application file for complete search history.

(56) References Cited

U.S. PATENT DOCUMENTS

| | | | |
|---|---|---|---|
| 2011/0030419 A1* | 2/2011 | Kikuchi .................. | F04B 35/04 62/498 |
| 2012/0293036 A1* | 11/2012 | Kleber ............... | H02K 15/0012 310/211 |

* cited by examiner

*Primary Examiner* — Joshua Benitez Rosario
*Assistant Examiner* — Alexander Moraza
(74) *Attorney, Agent, or Firm* — Leydig, Voit & Mayer, Ltd.

(57) ABSTRACT

A rotor for an LSIPM comprises a plurality of permanent magnets defining a number of poles ("P") of the LSIPM, and a plurality of rotor bars spaced about the rotor defining a rotor bar area ("BA"). The rotor bars are formed of a conductive material having an associated conductivity ("$\sigma_{RB}$"). End members are disposed on axial opposite ends of the rotor core. The end members are in electrical contact with the rotor bars. The end members are formed from a material having an associated conductivity ("$\sigma_{EM}$"). Each end ring member has a minimum geometric cross sectional area ("ERA") and outer diameter that generally corresponds to the rotor core outer diameter. The ERA is greater than 0.5 times the rotor bar area per the number of poles (BA/P) times a ratio of the rotor bar material conductivity to the end member material conductivity ($\sigma_{RB}/\sigma_{EM}$).

8 Claims, 8 Drawing Sheets

| End Ring Width (in) | End Ring Height (in) | ERA (in$^2$) | ERA/ BAP | Volt (V) | Strt Cur. (A) | Strt Tor. (T$_s$) | Asynch (RPM) | Slip (%) | Max Inert (lbft$^2$) |
|---|---|---|---|---|---|---|---|---|---|
| 0.200 | 1.500 | 0.300 | 0.300 | 474 | 271 | 388 | 1699.19 | 5.60 | 53 |
| 0.222 | 1.500 | 0.333 | 0.333 | 475 | 273 | 386 | 1701.52 | 5.47 | 57 |
| 0.334 | 1.500 | 0.501 | 0.500 | 469 | 272 | 365 | 1707.16 | 5.16 | 64 |
| 0.490 | 1.500 | 0.735 | 0.734 | 462 | 270 | 346 | 1714.19 | 4.77 | 68 |
| 0.850 | 1.500 | 1.275 | 1.273 | 460 | 272 | 338 | 1725.01 | 4.17 | 74 |
| 1.700 | 1.500 | 2.550 | 2.547 | 454 | 271 | 329 | 1726.12 | 4.10 | 75 |
| 2.550 | 1.500 | 3.825 | 3.820 | 450 | 270 | 325 | 1725.81 | 4.12 | 75 |
| 3.400 | 1.500 | 5.100 | 5.093 | 447 | 269 | 323 | 1725.35 | 4.15 | 74 |
| 4.250 | 1.500 | 6.375 | 6.367 | 448 | 271 | 327 | 1726.09 | 4.11 | 74 |

Bar Area = 4.0050468 in$^2$
BAP     = 1.001262

Fig. 9

END RING AND ROTOR BAR FOR LINE START PERMANENT MAGNET MOTOR

BACKGROUND

Synchronous motors, including line start, interior permanent magnet (LSIPM) motors, are typically very efficient. A LSIPM motor will produce torque to accelerate from zero speed when started across the line, and then operate as a synchronous motor with no rotor cage losses once fully up to synchronous speed. However, synchronous motors have limited capability to pull into synchronism loads that have a high torque or high inertia. For certain applications, it is necessary for a LSIPM to demonstrate satisfactory starting performance in addition to the steady-state performance. For a LSIPM motor, this includes more than just meeting rated starting current and starting torque during the asynchronous period of acceleration as would be the case for an induction motor. The LSIPM motor must also be able to pull a load into synchronism and achieve normal steady state operation. Both load torque and load inertia are considerations whether a specific LSIPM motor will be able to successfully start and synchronize a load. Accordingly, the benefits in efficiency gains and energy savings ordinarily associated with synchronous motors are not typically achieved in applications having loads with high inertia and/or high torque characteristics. In the past, an inverter has been used with synchronous motors in such applications to power the motor during starting. However, an inverter adds substantial costs and degrades system efficiency.

To achieve the steady state benefits of efficiency provided by synchronous motors, and reduce limitations during start-up, rotor end rings and rotor bars may be designed to improve the ability of a motor to synchronize loads with higher torque and/or inertia requirements compared with similar motors having conventional end ring and rotor bar designs. The rotor end rings and rotor bars may be configured to reduce full load asynchronous slip by decreasing rotor resistance during start-up. While a decrease in rotor resistance may theoretically be achieved using induction motor principles (i.e., by increasing the total cross sectional area of the rotor bars forming the starting cage), increasing the area of the rotor bars has a negative impact on the starting and full load operating performance of the motor. For instance, increased rotor bar area results in increased flux density in the rotor and lower power factor, higher current, and more losses at full load, and higher locked rotor current at starting.

SUMMARY

This disclosure is directed to employing an end ring which has a larger cross sectional area than would typically be used for the given bar area in order to reduce the asynchronous slip and improve load synchronization capability while not impacting the starting current or full load performance of the machine running as a synchronous motor. This disclosure is also directed to employing a rotor cage formed from materials with favorable conductive properties in order to reduce the asynchronous slip and improve load synchronization capability while not impacting the starting current or full load performance of the machine running as a synchronous motor.

DETAILED DESCRIPTION

Figure 1:
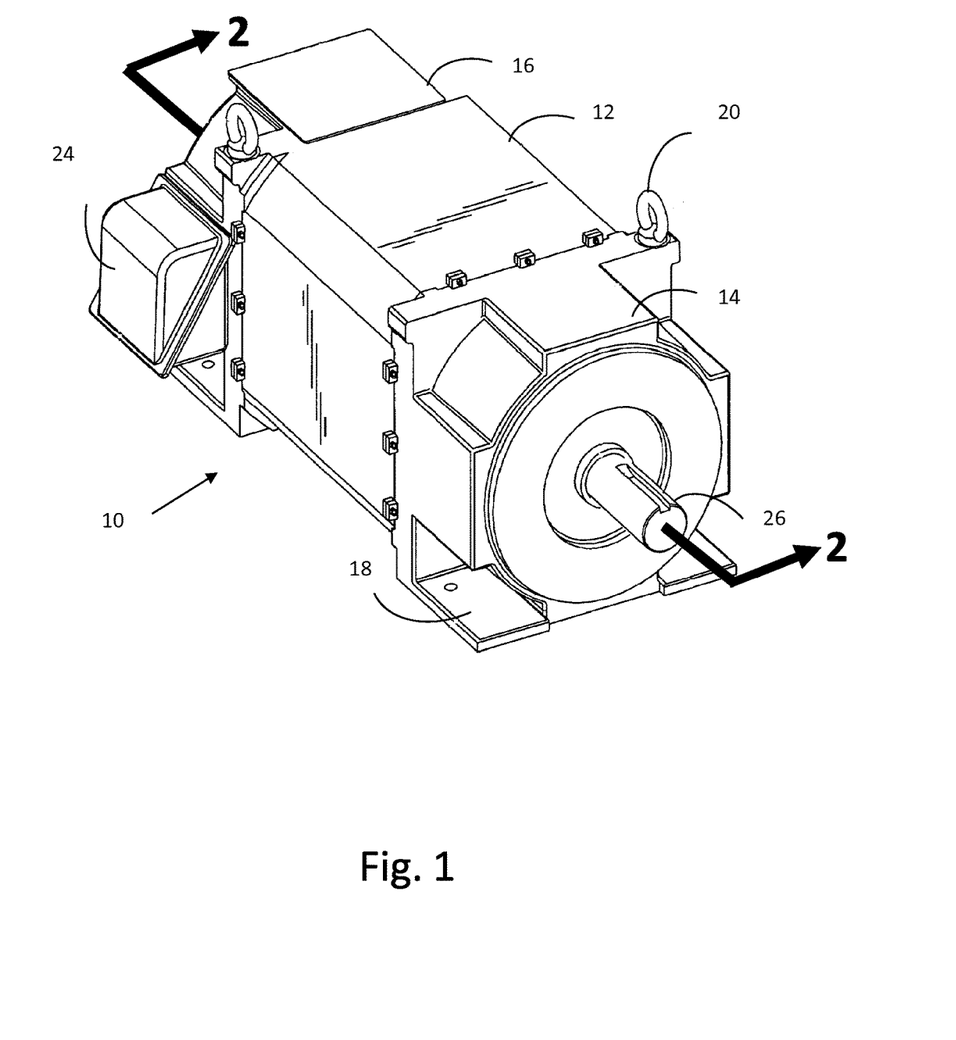
FIG. 1 is perspective view of an LSIPM.

FIG. 1 illustrates an exemplary LSIPM 10. The exemplary motor 10 comprises a frame 12 capped at each end by drive and opposite drive end caps 14,16, respectively. The frame 12 and the drive and opposite drive end caps 14,16 cooperate to form the enclosure or motor housing for the motor 10. The frame 12 and the drive and opposite drive end caps 14,16 may be formed of any number of materials, such as steel, aluminum, or any other suitable structural material. The drive and opposite drive end caps 14,16 may include mounting and transportation features, such as the illustrated mounting feet 18 and eyehooks 20.

To induce rotation of the rotor, current is routed through stator windings disposed in the stator. (See FIG. 2). Stator windings are electrically interconnected to form groups. The arrangement of the windings in the stator core defines the phases associated with the LSIPM. The stator windings are further coupled to terminal leads (not shown), which electronically connect the stator windings to an external power source (not shown), such as 480 VAC three-phrase power or 110 VAC single-phase power. A conduit box 24 houses the electrical connection between the terminal leads and the external power source. The conduit box 24 comprises a metal or plastic material, and advantageously, provides access to certain electrical components of the motor 10. Routing electrical current from its external power source through the stator windings produces a magnetic field that induces rotation of the rotor. A rotor shaft 26 coupled to the rotor rotates in conjunction with the rotor. That is, rotation of the rotor translates into a corresponding rotation of the rotor shaft 26. The rotor shaft may be coupled to any number of drive machine elements, thereby transmitting torque to the given drive machine element. By way of example, machines such as pumps, compressors, fans, conveyors, and so forth, may harness the rotational motion of the rotor shaft 26 for operation.

Figure 2:
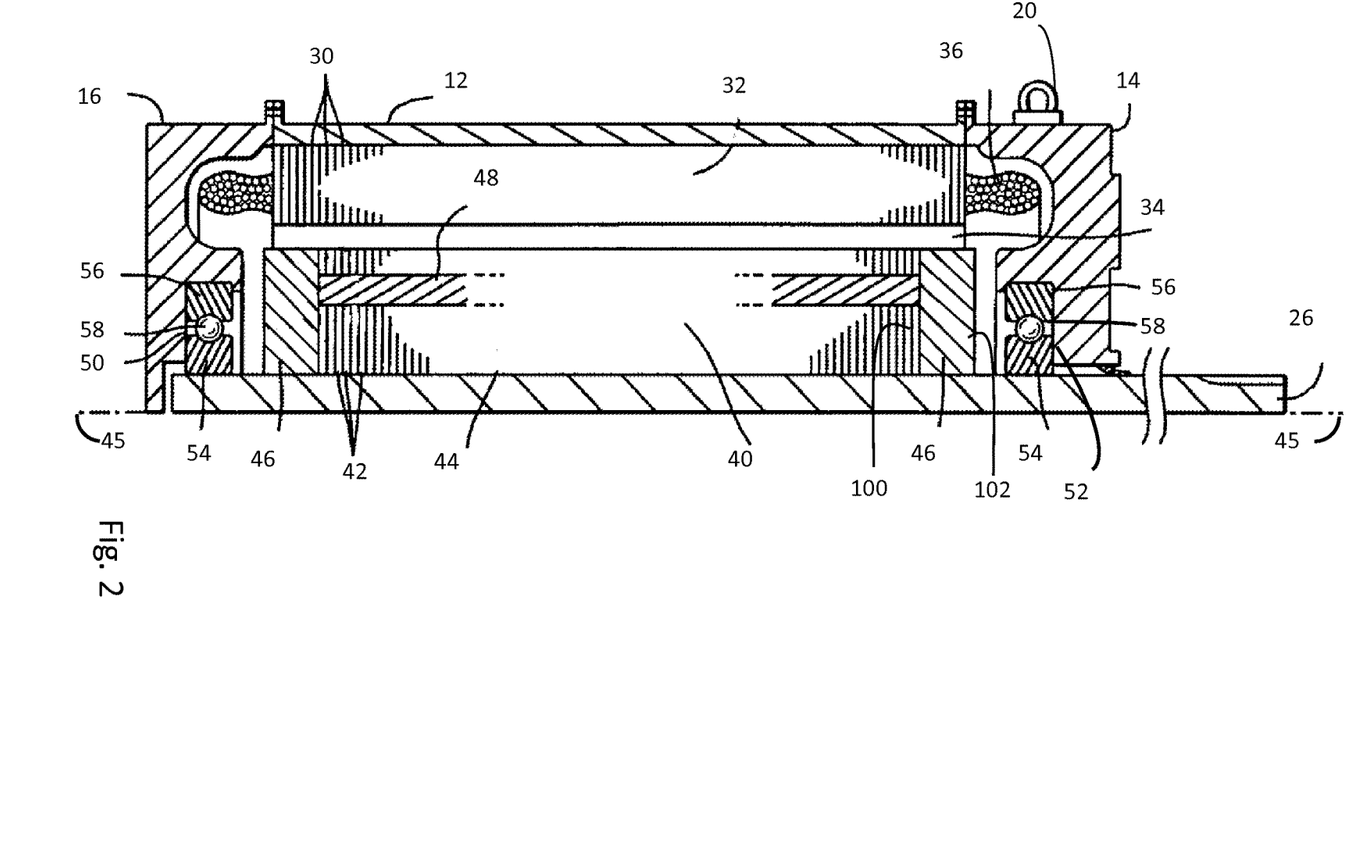
FIG. 2 is a partial cross-section view of an electric motor taken from lines 2-2 of FIG. 1.

FIG. 2 is a partial cross-section view of the motor 10 of FIG. 1 along plane 2-2. To simplify the discussion, only the top portion of the motor 10 is shown, as the structure of the motor 10 is essentially mirrored along its centerline. As discussed above, the frame 12 and the drive and opposite drive end caps 14,16 cooperate to form an enclosure or motor housing for the motor 10. Within the enclosure or motor housing resides a plurality of stator laminations 30 juxtaposed and aligned with respect to one another to form a lamination stack, such as a contiguous stator core 32. In the exemplary motor 10, the stator laminations 30 are substantially identical to one another, and each stator lamination 30 includes features that cooperate with adjacent laminations to form cumulative features for the contiguous stator core 32. For example, each stator lamination 30 includes a central aperture that cooperates with the central aperture of adjacent stator laminations to form a rotor chamber 34 that extends the length of the stator core 32 and that is sized to receive a rotor. Additionally, each stator lamination 30 includes a plurality of stator slots disposed circumferentially about the central aperture. The stator slots cooperate to receive one or more stator windings 36, which are illustrated as coil ends in FIG. 2, that extend the length of the stator core 32. As described in more detail below, upon start-up, the stator winding is energizable with an alternating voltage to establish a rotating primary field that co-acts with the rotor bars of the rotor to start the rotor under induction motor principles.

In the exemplary motor 10, a rotor assembly 40 resides within the rotor chamber 34. Similar to the stator core 32, the rotor assembly 40 comprises a plurality of rotor laminations 42 aligned and adjacently placed with respect to one another. Thus, the rotor laminations 42 cooperate to form a contiguous rotor core 44. When assembled, the rotor laminations 42 cooperate to form a shaft chamber that extends through the center of the rotor core 44 and that is configured to receive the rotor shaft 26 therethrough. The rotor shaft 26 is secured with respect to the rotor core 44 such that the rotor core 44 and the rotor shaft 26 rotate as a single entity about a rotor center axis 45.

The exemplary rotor assembly 40 also includes electrically conductive members, such as rotor bars 48, disposed in the rotor core 44 electrically connected to rotor end rings or end members 46 to form the starting cage. The end rings or end members 46, which are disposed on opposite ends of the rotor core 44 are generally circular in cross-section and have an outer diameter that generally approximates the diameter of the rotor laminations 42. The rotor bars 48 in cooperation with the end rings 46 form at least one closed electrical pathway for induced current within the rotor 40. Accordingly, the rotor bars 48 and the end rings 46 comprise materials having good electrical conductivity, such as copper alloys as described below. Additional detail of the rotor bars and the end rings will be described in greater detail below.

To support the rotor assembly 40, the exemplary motor 10 includes drive and opposite drive bearing sets 50,52, respectively, that are secured to the rotor shaft 26 and that facilitate rotation of the rotor assembly 40 within the stationary stator core 32. During operation of the motor 10, the bearing sets 50,52 transfer the radial and thrust loads produced by the rotor assembly 40 to the motor housing. Each bearing set 50,52 includes an inner race 54 disposed circumferentially about the rotor shaft 26. The tight fit between the inner race 54 and the rotor shaft 26 causes the inner race 54 to rotate in conjunction with the rotor shaft 26. Each bearing set 50,52 also includes an outer race 56 and rotational elements 58, which are disposed between the inner and outer races 54,56. The rotational elements 58 facilitate rotation of the inner races 54 while the outer races 56 remain stationary and mounted with respect to the drive and opposite drive end caps 14,16. Thus, the bearing sets 50,52 facilitate rotation of the rotor assembly 40 while supporting the rotor assembly 40 within the motor housing, i.e., the frame 12 and the drive and opposite drive end caps 14,16. To reduce the coefficient of friction between the races 54,56 and the rotational elements 58, the bearing sets 50,52 are coated with a lubricant. Although the drawings show the bearing sets 50,52 with balls as rotational elements, the bearing sets may be other constructions, such as sleeve bearings, pins bearings, roller bearings, etc.

FIGS. 3-6 provide further detail of illustrative embodiments of the rotor laminations 42. Each rotor lamination 42 has a generally circular cross-section and is formed of a magnetic material, such as electrical steel. Extending from end-to-end, i.e., transverse to the cross-section, each lamination 42 includes features that, when aligned with adjacent laminations 42, form cumulative features that extend axially through the rotor core 44. For example, each exemplary rotor lamination 42 has a circular shaft aperture 62 located in the center of the lamination 42. The shaft apertures 62 of adjacent laminations 42 cooperate to form a shaft chamber configured to receive the rotor shaft 26 (see FIG. 2) therethrough. The rotor core has an outer diameter ("$D_r$").

Additionally, each lamination 42 includes a series of rotor bar slots 64 that are arranged at positions about the lamination such that when assembled, the rotor bar slots cooperate to form channels for the rotor bars that extend through the rotor core 44. The rotor bar slots are spaced radially inward from the rotor outer diameter ($D_r$). As shown in the drawings, each of the rotor bar slots may extend radially outward to generally the same radial position relative to the rotor outer diameter ($D_r$), or one or more rotor bar slots may extend radially outward and terminate at different radial distances relative to the outer diameter ($D_r$), depending upon the application. The rotor bars 48 may present the same shape as the rotor bar slots 64 to provide a tight fit for the rotor bars 48 within the rotor channels. The rotor bars may be manufactured with tight tolerances between the rotor bars 48 and the rotor bar slots, for instance, for a fabricated/swaged rotor bar design.

Figure 3:
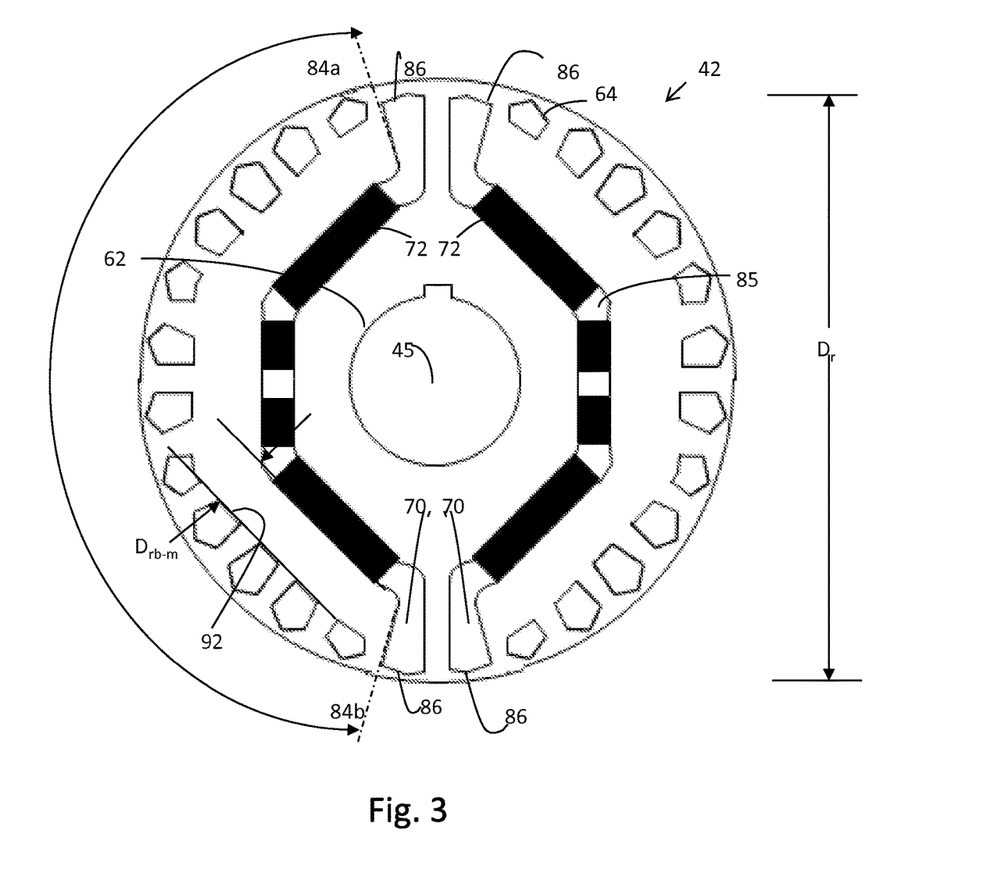
FIGS. 3-6 show illustrative embodiments of laminations used in a rotor of the motor of FIG. 1.
Figure 4:
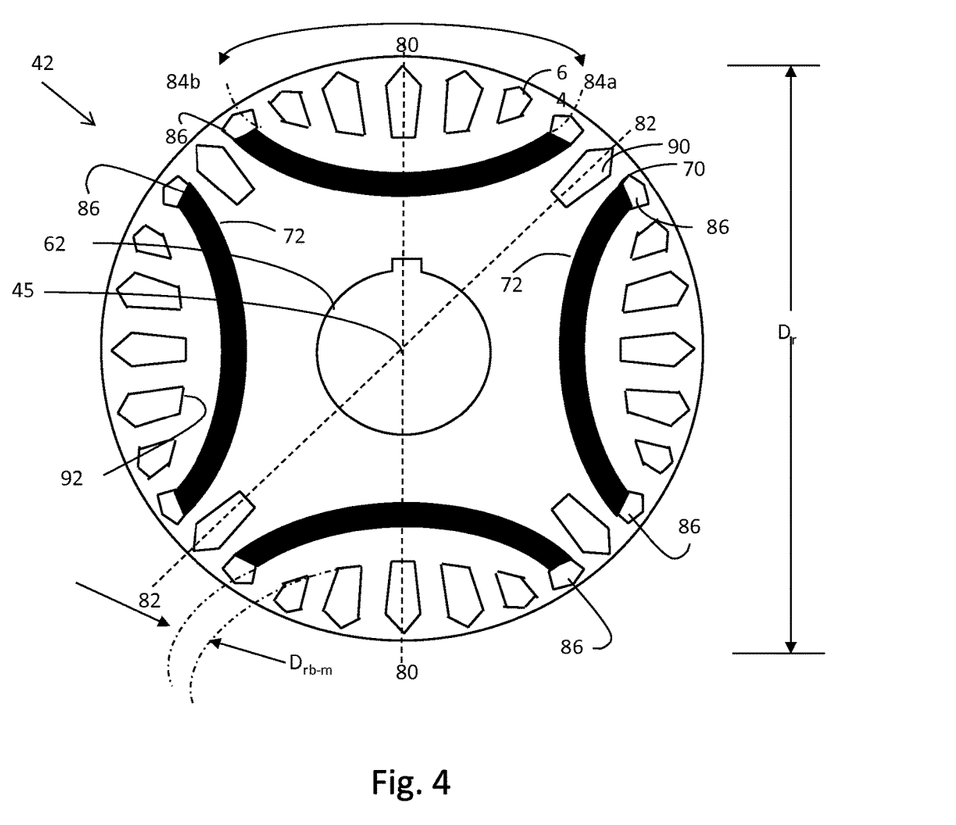
Figure 5:
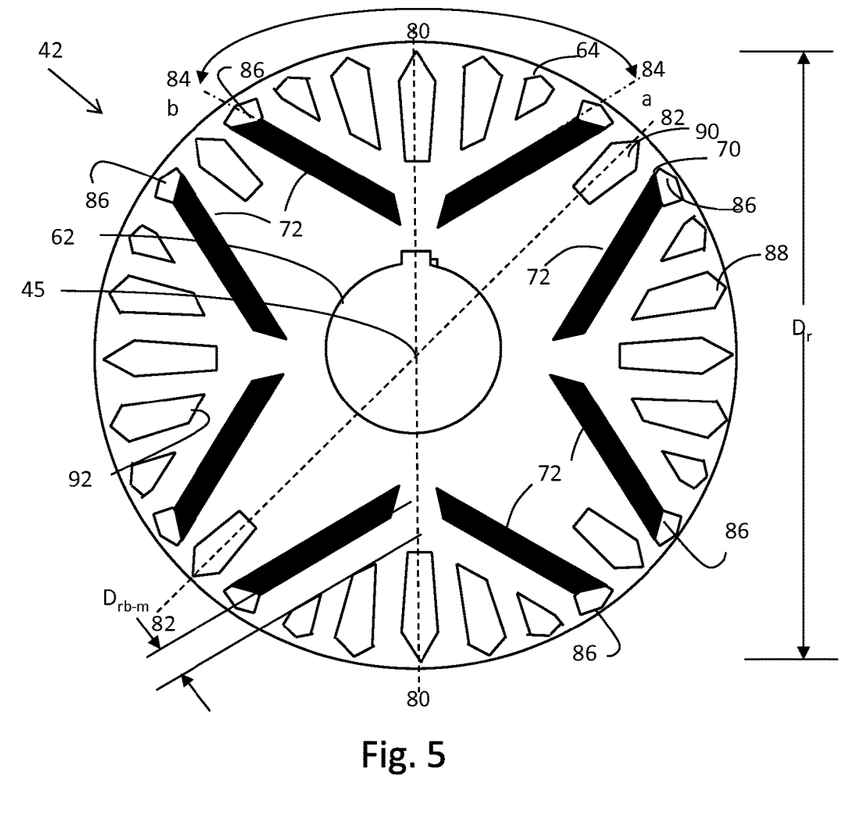
Figure 6:
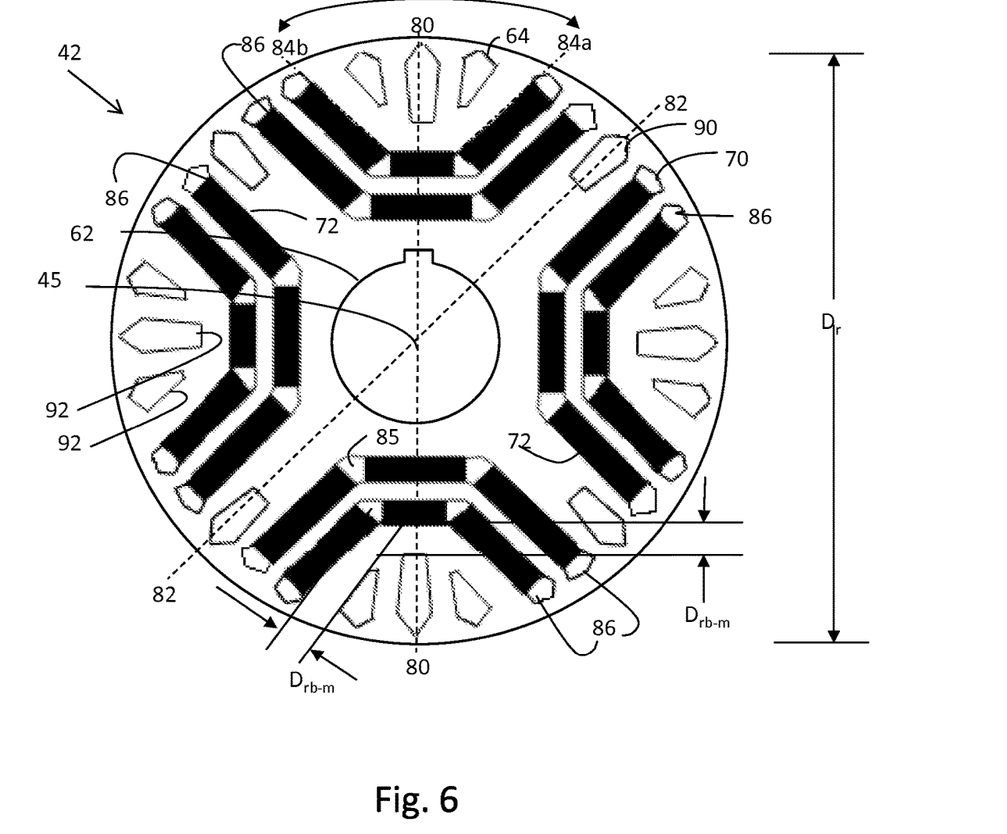

Additionally, the rotor laminations 42 include magnet slots 70. Magnets 72 may be disposed in the magnet slots in various ways to form poles for the rotor. The magnet slots may be arranged so the magnets are in a single layer or multi-layers. The magnet slots may also be arranged so the magnets form a conventional "v"- or "u"-shape, or an inverted "v"- or "u"-shape. There may be only one magnet per slot or multiple magnets per slot. The magnets may be magnetized in a generally radial direction to establish alternately inwardly and outwardly disposed north and south poles on adjacent magnets. This means that adjacent magnets cooperate to establish alternate north and south poles on the periphery of the rotor. The rotor may be constructed with any even number of poles. An exemplary lamination for a two pole motor is shown in FIG. 3, and exemplary laminations for a four pole motor are shown in FIGS. 4-6. As shown in the drawings by example and not in any limiting sense, the magnets may establish a direct axis as indicated by reference character 80 and a quadrature axis as indicated by reference character 82. The magnets define a general axis of magnetization (north or south pole) on the periphery of the rotor. The edges of the magnet slots facing the general axis of magnetization, which are radially outward from the magnets, establish a generally arcuate saturation boundary area as indicated by reference characters 84a,84b. In cases, where a magnet is disposed in the magnet slot, the edges of the magnet slots facing the general axis of magnetization and the edges of the magnets will be the same. FIGS. 3 and 6 show embodiments where there is a gap 85 between the permanent magnets in the magnet slots. In a multi-layer arrangement such as shown in FIG. 6, the saturation boundary area is defined by the magnet slots that are nested radially outward the farthest.

In each of the designs of the laminations shown in FIGS. 3-6, the magnet slots 70 extend to the peripheral edge of the rotor such that an end of the magnet slot is adjacent the peripheral edge. One or more of the magnet slots may have its radially outward end at generally the same radial position relative to the rotor outer diameter ($D_r$) and the rotor bar slots as shown in the drawings, or one or more magnet slots may extend radially outward and terminate at different distances relative to each other and/or the rotor bar slots, depending upon the application. The magnets 72 disposed in the magnet slots have a smaller longitudinal length in the direction of the magnet slots than the magnet slots such that the magnet when installed in the magnet slot forms a magnet slot aperture 86 between the end of the permanent magnet and the magnet slot. The magnet slot aperture may be filled with conductive material to form additional rotor bars that are also connected to the end members 46.

The rotor bars 48 forming the starting cage may have a different size, shape, and spacing from rotor bars found in a machine having a uniform cage. Additionally, the rotor bar slots 64 may be distributed about the rotor in a manner that is asymmetric rather than evenly distributed, i.e., asymmetric rather than equiangularly spaced, around the outer edge of the lamination surface. Additionally, the rotor bar slots may have an arbitrary shape. The laminations may be stacked off-set to one another such that the rotor bar in the slot has a helix relative to the rotor axis of rotation. Additionally, a rotor bar slot 90 may be provided to align with the quadrature axis 82. The rotor bar slot 90 of the quadrature axis may have a geometry which matches at least one of the rotor bar slots aligned with the direct axis 80. Although some of the drawings show a plurality of rotor bar slots in the direct axis and one rotor bar slot in the quadrature axis, other variations may be used. The rotor bar area ("BA") is the cumulative area of all of the rotor bar slots in a lamination that are intended to be filled with conductive material, including areas between magnets in the magnet slots, and including rotor bar slots provided in the quadrature axis and outside of the saturation boundary area.

The laminations shown in FIGS. 3-6 are configured to optimize paths for flux over a range of conditions including at rated load. In each of the laminations shown in FIGS. 3-6, the arrangement of the starting cage of the rotor bars and the magnets allows for passage of rotor flux under a wide range of loads and operating conditions. With each of the exemplar embodiments of FIGS. 3-6, the distance between the rotor bar slots disposed in the saturation boundary area 84a,84b and the magnet slots is selected so that each rotor bar slot in the saturation boundary area may be positioned away from an adjacent magnet slot by a distance that equals or exceeds about four percent (4%) of the pole pitch. According to another aspect of the present disclosure, the closest approach distance of any one of the rotor bar slots in the saturation boundary area to an adjacent magnet slot may be about equal or exceed four percent of the pole pitch. The closest approach distance is referred to hereinafter as ("$D_{rb-m}$") and is defined by the equation ("$D_{rb-m}$")≥0.04×("pp"). The pole pitch for the machine ("pp") may be defined by the equation ("pp")={("$D_R$")×(π)}/("P"), where "$D_R$" is the diameter of the rotor and ("P") is the number of poles for the machine as defined by the number of groups of permanent magnets. One or more of the rotor bar slots in the saturation boundary area may be arranged to maintain this parameter relative to an adjacent magnet slot. Rotor bar slots outside of the saturation boundary area, for instance, rotor bar slots 90 generally aligned with the quadrature axis 82, may also be positioned to maintain this parameter relative to an adjacent magnet slot.

In the rotor designs shown in FIGS. 3-6, at least one of the rotor bar slots 64 in the saturation boundary area has a radial interior edge 92 which conforms generally to a side of the magnet 72 in the adjacent magnet slot 70. FIGS. 3-6 show the magnet arranged in the magnet slot in various configurations. In each example, the interior radial edge of one or more of the rotor bar slots 64 in the saturation boundary area has a geometry which generally matches the geometry of the magnet adjacent to the rotor bar slot. One or more of the rotor bar slots in the saturation boundary area may be formed to have a radial inward edge which defines a reference plane generally parallel to the adjacent magnet. In this way, one or more of the rotor bar slots may have a distance to the adjacent magnet slot that meets or exceeds the four percent (4%) of the pole pitch ("pp"). Rotor bar slots outside of the saturation boundary area, for instance, rotor bar slots 90 generally aligned with the quadrature axis 82, may also be shaped in a similar manner to maintain this parameter.

Figure 7:
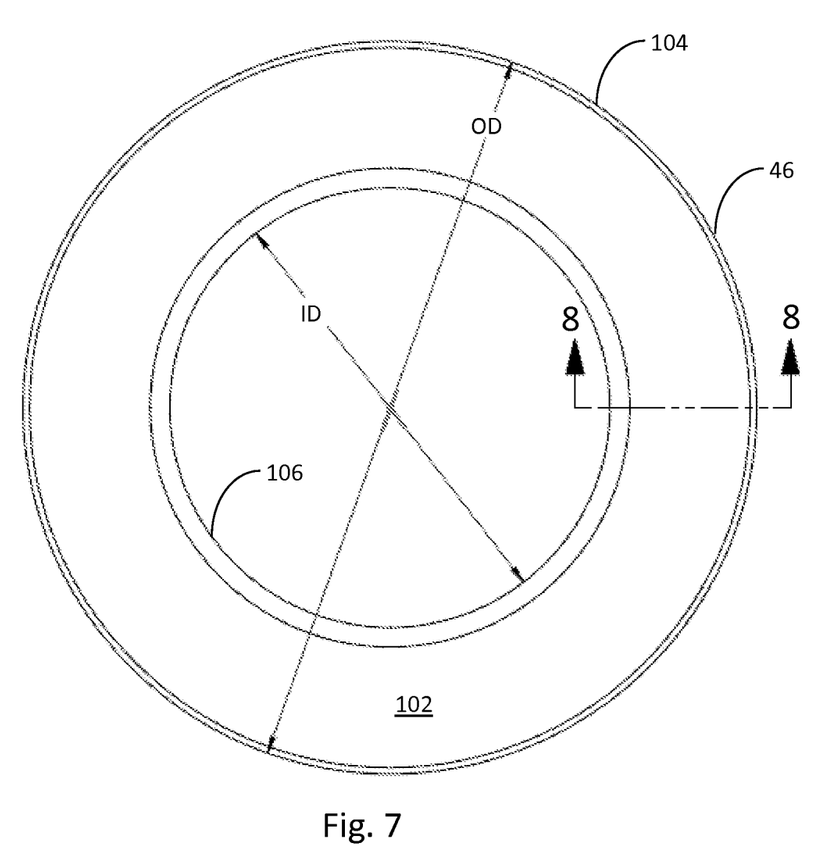
FIG. 7 is an enlarged view of an end ring.
Figure 8:
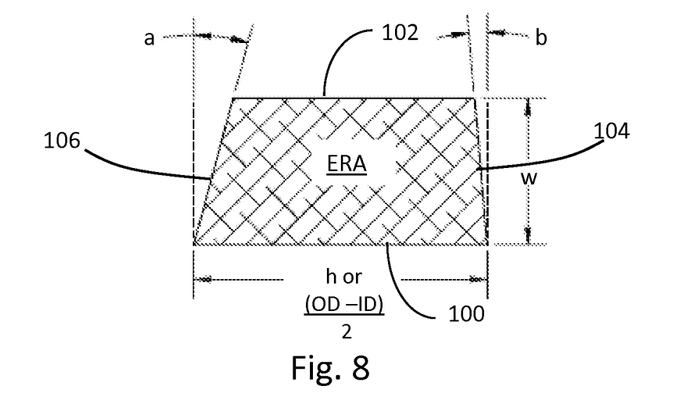
FIG. 8 is a cross-sectional view of the end ring taken from lines 8-8 of FIG. 7.

Referring to FIGS. 7 and 8, each of the end rings 46 comprises an annular disk with generally flat faces 100,102 and an outer diameter surface 104 and an inner diameter surface 106. The end ring outer diameter surface 104 has an outer diameter ("OD") with a dimension that generally equal to the rotor core outer diameter. The end ring inner diameter surface 106 has an inner diameter ("ID") with a dimension that generally corresponds to the rotor shaft outer diameter. The inner face 100 abuts the laminations 40, and the outer face 102 may have features allowing the rotor to be balanced (i.e., drilled holes). The inner and outer faces 100,102 may be separated by a width ("w"). The outer and inner diameter surfaces may be separated by a height ("h") which is equal to (øOD−øID)/2. Providing the end rings with an outer diameter generally equal to the rotor core outer diameter produces favorable stress conditions in the end rings 46 when the rotor operates at rated speed. With the end ring outer diameter generally equal to or slightly less than the rotor core outer diameter, the center of gravity of the end ring is sufficiently positioned toward the axis of rotation of the rotor to reduce stress in the end plates while providing structural integrity for the rotor core without otherwise increasing the rotor core inertia. The end ring outer diameter and inner diameter surface may be tapered. With reference to FIG. 8, the end ring area ("ERA") may be provided by the equation ERA=[[(øOD−øID)×w]−[$w^2$×(TAN(a)+TAN(b))]]/2.

While the laminations 40 forming the rotor core may be made from electrical steel, as is typical, the end rings 46 may be made from a copper material or an aluminum material, or other highly electrically conductive metal. The conductivity ("σ") associated with several commonly used materials for rotor bars and end rings is shown below. For purposes of discussion herein, materials with a conductivity of greater than 90% (IACS) are considered high conductivity materials.

| Base Alloy | Material | Conductivity (IACS) |
|---|---|---|
| Aluminum | Aluminum Alloy 100.1 | 54% |
| Aluminum | Aluminum Alloy 130.1 | 55% |
| Aluminum | Aluminum Alloy 150.1 | 57% |
| Aluminum | Aluminum Alloy 170.1 | 59% |
| Copper | Copper Alloy C10100, 101200 | 101% |
| Copper | Copper Alloy C11000 | 101% |
| Copper | Copper Alloy C11300, C11400, C11600 | 100% |
| Copper | Electrolytic (ETP) | 101% |
| Copper | Silver-bearing, 8 oz/t | 101% |
| Copper | Silver-bearing, 10 to 15 oz/t | 101% |
| Copper | Silver-bearing, 25 to 30 oz/t | 101% |
| Copper | Oxygen-free (OF) | 101% |
| Copper | Phosphorized (DLP) | 97% to 100% |
| Copper | Free-cutting (S, Te or Pb) | 90% to 98% |
| Copper | Chromium coppers | 80% to 90% |
| Copper | Phosphorized (DHP) | 80% to 90% |
| Copper | Cadmium copper (1%) | 80% to 90% |

As mentioned before, the rotor bars may be fabricated/ swaged or may be cast. One or both of the end rings may be fabricated and/or cast. To allow a cast end ring to be removed from a mold, the ring outer and inner diameter surfaces may be tapered as shown in FIGS. 7 and 8. The rotor bars and end rings may be made from different materials with different or similar conductivities. The rotor bars and end rings may also be made from the same material.

A decrease in asynchronous slip may be achieved when the rotor bars are made from materials with favorable conductivity properties. For instance, for a given load and starting current, the asynchronous slip of a LSIPM may be decreased by forming its rotor bars from copper allows rather than from aluminum alloys.

Figure 9:
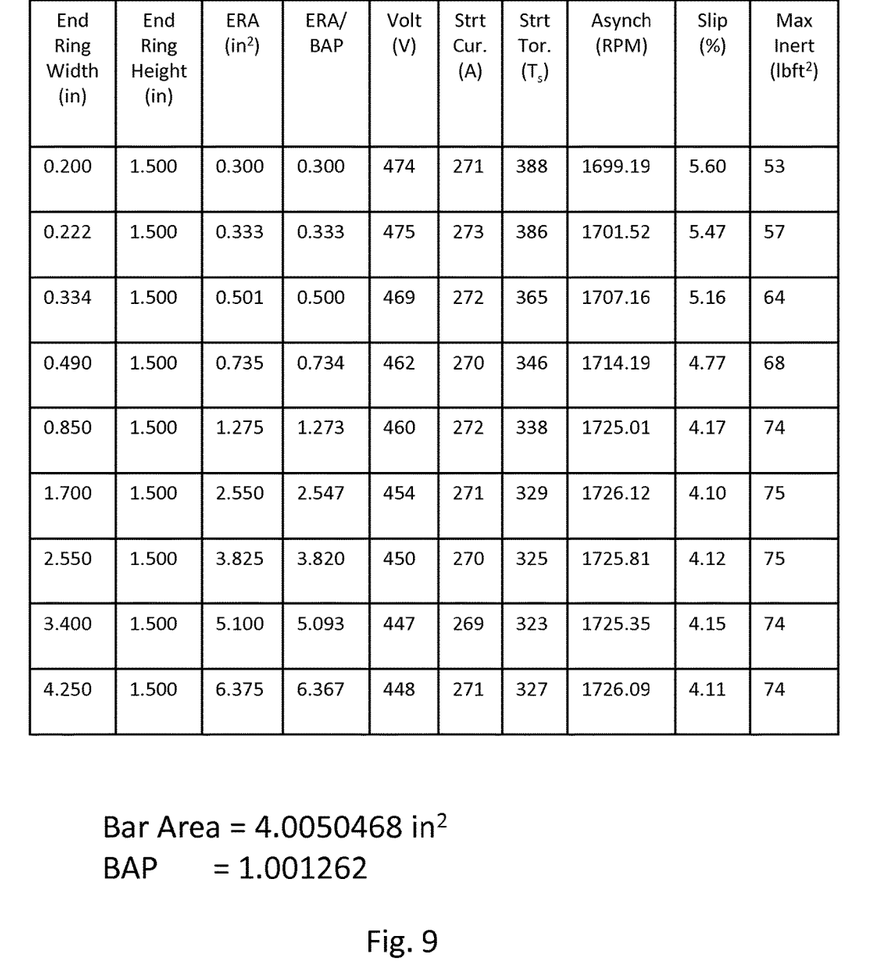
FIG. 9 is a chart showing the slip and load inertia for a given end ring width for a LSIPM.

A decrease in asynchronous slip may be achieved when the minimum geometric cross-sectional area of the end rings ("ERA") is greater than 0.5 times the rotor bar area ("BA") per the number of poles (P) times a ratio of the rotor bar material conductivity to the end ring material conductivity ($\sigma_{RB}/\sigma_{EM}$). FIG. 9 provides a chart showing data associated with a 280 size frame, 4 poles/3 phase LSIPM with a 6" core length having a total rotor bar area ("BA") of 4.0050468 in$^2$. The bar area per pole (BAP) was given by the equation (BAP=(BA/P)) and is shown as 1.001262. Because the rotor bars and the end rings were formed from the same material, the ratio of the rotor bar material conductivity to the end member material conductivity ($\sigma_{RB}/\sigma_{EM}$) is 1. Each row of the chart of FIG. 9 corresponds to a rotor configuration comprising an end ring with the same outer diameter and inner diameter (i.e., the same height ("h")) and a different width ("w"). The slip associated with each configuration decreases as the ERA/BAP approaches 0.5. When ERA/BAP approaches 1.3, slip is relatively constant. Likewise, the maximum inertia to be synchronized increases as the ERA/BAP approaches 0.5, and when ERA/BAP approaches 1.3, the maximum inertia to be synchronized is relatively constant. In each case, the stator flux was essentially a constant value with a starting current ranging from 269 to 273 amps. For purposes of discussion herein, an equivalent range includes variations of up to and including 2.5% of starting current. As shown in the tabulated data of FIG. 9, a range of ERA/BAP of about ⅔ to about 2.0 for rotor bars and end rings having the same conductivity provides improvements in inertia synchronization capability without significant impact on starting current.

If end rings and bars are cast, there is a potential for porosity which decreases conductivity. Thus, the ratio of ERA/BAP may be selected toward the higher range to account for the decrease in effective conductivity of the end ring due to the higher porosity in the end ring than the rotor bar. In a similar fashion, the ratio of the rotor bar material conductivity to the end member material conductivity ($\sigma_{RB}/\sigma_{EM}$) provides a factor to account for rotor bar materials and end ring materials having different material conductivities. For instance, where the rotor bars are made of copper and the end rings are made of aluminum, the ratio of the conductivity of copper to the conductivity of aluminum is 1.772 (i.e., 101/57). A factor of 1.772 can then be applied to ERA/BAP as desired. Thus, in the example of FIG. 9, in order for the motor to synchronize a load of 74 lb-ft$^2$, the minimum width of an aluminum end ring used with copper rotor bars would need to be increased from 0.850 in. to 1.505 in. for the same diameter end ring. While the drawings show end rings having the same cross-sectional geometry, one end ring may vary dimensionally from its axially opposite end ring, for instance, have a different width (w) dimension. However, for purposes of a design capable of synchronizing the higher inertia as described above, the cross sectional area ("ERA") of both end rings should be no less than about 0.5 times greater than the rotor bar area per the number of poles (BAP) times a ratio of the rotor bar material conductivity to the end member material conductivity ($\sigma_{RB}/\sigma_{EM}$), and preferably between about ⅔ and about 2 times greater than the rotor bar area per the number of poles (BAP) times a ratio of the rotor bar material conductivity to the end member material conductivity ($\sigma_{RB}/\sigma_{EM}$). As is seen in the foregoing, a LSIPM motor according to the present teachings may drive a relatively higher inertial load from start to at least near synchronous speed during steady state operation of the motor when its ERA is greater than about 0.5 times the rotor bar area per the number of poles (BAP) times a ratio of the rotor bar material conductivity to the end member material conductivity ($\sigma_{RB}/\sigma_{EM}$), with other variables associated with the motor being equal or remaining constant, for instance, starting current, starting torque, bar configuration, magnet configuration, or other configurations of the laminations.

The performance of an LSIPM during synchronous steady state operation may be enhanced by maximizing the saturation boundary area and the magnet size. These considerations result in less lamination area being available for rotor bars for a given size motor. Providing an end ring member with a minimum geometric cross sectional area ("ERA") that is greater than about 0.5 times the rotor bar area per the number of poles (BAP) times a ratio of the rotor bar material conductivity to the end member material conductivity ($\sigma_{RB}/\sigma_{EM}$) provides improvements in the LSIPM's ability to synchronize loads with a relatively high inertia. For instance, a LSIPM having an end ring member with a minimum geometric cross sectional area ("ERA") that is greater than about 0.5 times the rotor bar area per the number of poles (BAP) times a ratio of the rotor bar material conductivity to the end member material conductivity ($\sigma_{RB}/\sigma_{EM}$) can synchronize a load with an inertia that is greater than the load the LSIPM motor can synchronize when the end ring member has a minimum geometric cross sectional area ("ERA") that is less than about 0.5 times the rotor bar area per the number of poles (BAP) times a ratio of the rotor bar material conductivity to the end member material conductivity ($\sigma_{RB}/\sigma_{EM}$), for an equivalent range of starting current. In another aspect of the teachings, providing a rotor cage formed from materials having conductivity greater than other materials allows for improvements in the LSIPM's ability to synchronize loads with a relatively high inertia. For instance, a LSIPM having a rotor cage formed from a material having a first conductivity can synchronize a load with an inertia that is greater than the load the LSIPM motor can synchronize when the rotor cage is formed from materials having a conductivity lower than the first conductivity and the motor is subjected to an equivalent range of starting current.

While certain embodiments have been described in detail in the foregoing detailed description and illustrated in the accompanying drawings, those with ordinary skill in the art will appreciate that various modifications and alternatives to those details could be developed in light of the overall teachings of the disclosure. Particularly, the figures and exemplar embodiments of the rotor laminations are intended to show illustrative examples and not to be considered limiting in any sense. Accordingly, the particular arrangements disclosed are meant to be illustrative only and not limiting as to the scope of the invention which is to be given the full breadth of the appended claims and any and all equivalents thereof.

What is claimed is:

1. An electrical machine comprising:
   a stator;
   a rotor core having an outer diameter disposed within the stator, the rotor core comprising a plurality of permanent magnets defining a number of poles (P) of the machine, the rotor core further comprising a plurality of rotor bars spaced about the rotor core center axis, the rotor bars defining a rotor bar area ("BA"), the rotor bars being formed of a conductive material having a conductivity ($\sigma_{RB}$); and
   end members disposed on axial opposite ends of the rotor core, the end members being in electrical contact with the rotor bars, the end members being formed from a material having an associated conductivity ($\sigma_{EM}$), each end member having a minimum geometric cross sectional area ("ERA"), wherein the end members have an outer diameter that is generally equal to the rotor core outer diameter, and wherein the ERA is greater than about 0.5 times the rotor bar area per the number of poles (BA/P) times a ratio of the rotor bar material conductivity to the end member material conductivity ($\sigma_{RB}/\sigma_{EM}$).

2. The machine of claim 1, wherein the ERA is between about ⅔ times and about 2 times greater than the rotor bar area per the number of poles (BA/P) times the ratio of the rotor bar material conductivity to the end member material conductivity ($\sigma_{RB}/\sigma_{EM}$).

3. The machine of claim 1, wherein the permanent magnets are disposed in slots spaced radially inward of the rotor outer diameter and define a general axis of magnetization of each pole of the rotor, and edges of the magnet slots that face the general axis of magnetization define a saturation boundary.

4. The machine of claim 3, wherein the magnet slots are adjacent to the rotor outer diameter and extend generally inward toward a center axis of the rotor core.

5. The machine of claim 4, wherein at least some of the rotor bar slots are disposed in the saturation boundary area and spaced from the magnet slots.

6. The machine of claim 1, wherein the rotor core comprises a plurality of generally like laminations stacked end to end to form a contiguous rotor core.

7. The machine of claim 1, wherein the end ring members have generally a same cross sectional area.

8. The machine of claim 1, wherein the rotor bars and the end members are formed from a same base alloy.

* * * * *